(12) United States Patent  
Maidee

(10) Patent No.: US 12,430,253 B1  
(45) Date of Patent: Sep. 30, 2025

(54) SELECTABLE SLICE MAPPING

(71) Applicant: Advanced Micro Devices, Inc., Santa Clara, CA (US)

(72) Inventor: Pongstorn Maidee, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/757,798

(22) Filed: Jun. 28, 2024

(51) Int. Cl.
*G06F 12/084* (2016.01)
*G06F 12/02* (2006.01)
*G06F 12/0811* (2016.01)

(52) U.S. Cl.
CPC ........ *G06F 12/084* (2013.01); *G06F 12/0246* (2013.01); *G06F 12/0811* (2013.01)

(58) Field of Classification Search
CPC . G06F 12/084; G06F 12/0246; G06F 12/0811
See application file for complete search history.

(56) References Cited

U.S. PATENT DOCUMENTS

| | | | |
|---|---|---|---|
| 2017/0132147 A1* | 5/2017 | Loh | G06F 12/084 |
| 2018/0329819 A1* | 11/2018 | Hagersten | G06F 12/0824 |
| 2021/0191777 A1* | 6/2021 | Roozbeh | G06F 12/0811 |
| 2022/0155968 A1* | 5/2022 | Shveidel | G06F 3/0653 |

* cited by examiner

*Primary Examiner* — Ryan Bertram
(74) *Attorney, Agent, or Firm* — FIG. 1 Patents

(57) ABSTRACT

Systems and techniques for selectable slice mapping in shared cache levels are described. In one example, a processor includes a cache system having a shared cache level of a hierarchy of cache levels and slice hashing circuitry associated with the shared cache level. The shared cache level includes multiple slices accessible by threads running on multiple processor cores. The slice hashing circuitry assigns memory addresses used by a particular thread to a subset of the multiple slices closest to the processor core on which the thread runs. The assignment of the slice subset is based on the latency requirements or the data usage of the thread in at least one implementation. The described techniques improve tail latencies for multiple core systems and alleviate the need for additional interconnections for shared cache levels.

20 Claims, 7 Drawing Sheets

SELECTABLE SLICE MAPPING

BACKGROUND

Processors utilize shared cache memory to store frequently accessed data for quicker retrieval. As the number of processor cores in a system on chip (SoC) and the size of the shared cache increases, the number of slices in the shared cache also increases. While this reduces the need to access external memory, the growing number of slices leads to longer tail latency within the shared cache due to the increasing distance between a core and the farthest slice. Furthermore, meeting high-bandwidth requirements becomes more challenging because interconnect wires do not scale as well as logic systems, resulting in lower relative bandwidth availability as chip fabrication processes improve.

DETAILED DESCRIPTION

Overview

Figure 1:
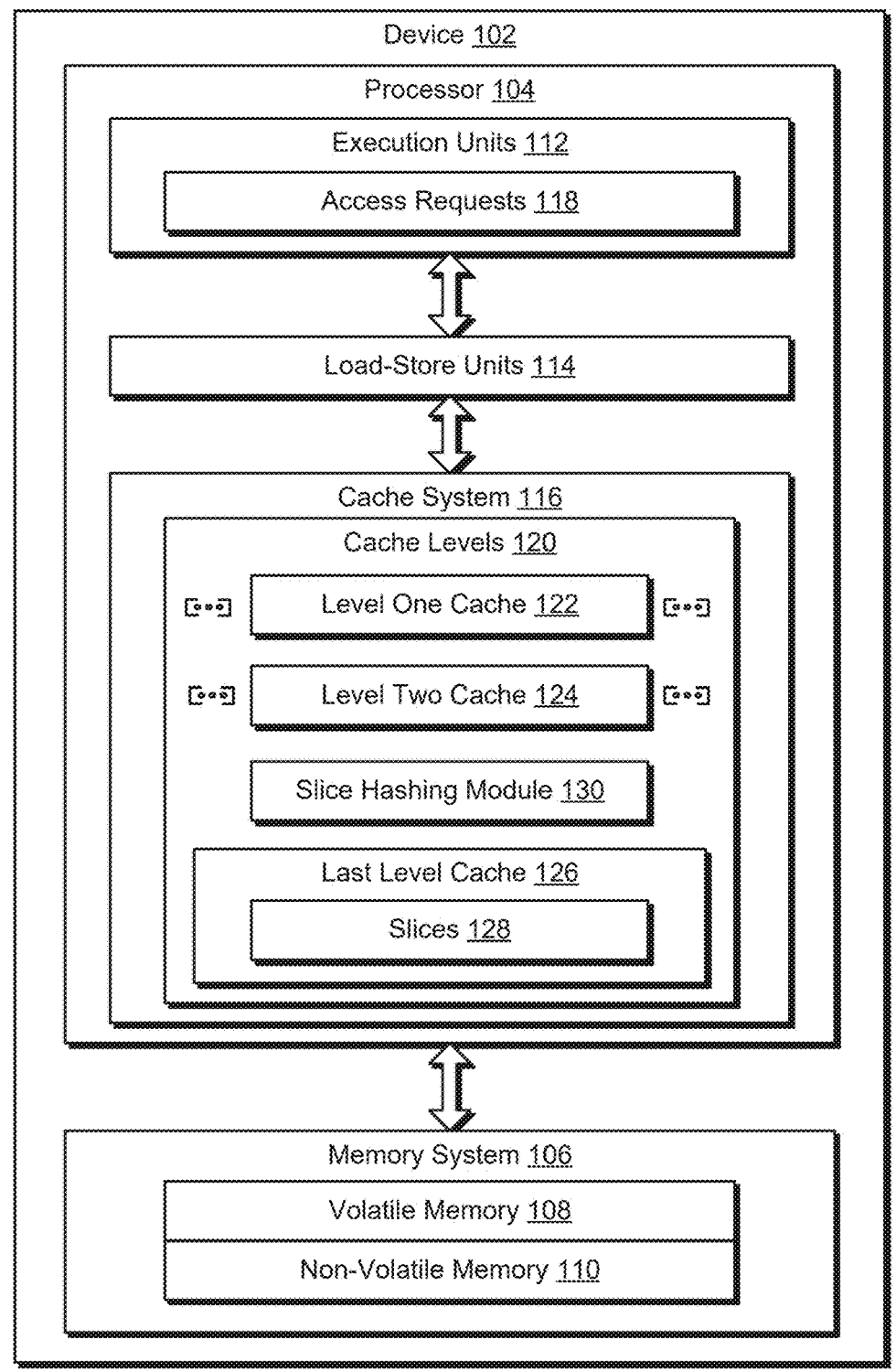
FIG. 1 is a block diagram of a non-limiting example system to implement selectable slice mapping.

An example system includes a processor communicatively coupled to a memory system with volatile and non-volatile memory. The processor includes a cache system with multiple cache levels. For example, the cache system includes level one caches and level two caches dedicated to the respective cores of the processor. A last level or level-three cache is also shared among the multiple processor cores.

As the number of processor cores and the amount of shared cache increases, the number of slices in shared cache also increases. These increases reduce the need for off-chip memory (e.g., the volatile and non-volatile memory of the memory system). However, the increased number of slices lengthens the tail latency (e.g., the slowest requests) for shared-cache access because the relative distance between a core and the farthest slice increases. High bandwidth requirements within processors become challenging because each processor core accesses each slice. Even maintaining the same number of slices over shrinking process nodes is challenging because interconnect couplings do not scale as well as logic systems, leading to lower relative bandwidth availability as fabrication processes scale.

To address these challenges, different network topologies (e.g., the connections among processor cores and cache slices) have been introduced to lower the tail latency. These conventional approaches generally trade more interconnect wires for shorter tail latencies. In contrast, the described selectable slice mapping provides dynamic slice hashing that improves the performance of an application and the entire system by reducing the need for additional interconnections.

Slice hashing is widely used to map adjacent addresses or highly utilized address ranges to multiple cache slices to increase throughput for the shared cache. Conventional slice hashing techniques evenly distribute physical addresses to each slice. From an application's perspective, slice hashing increases tail latency, which worsens as the number of processor cores and cache slices increase.

To address this problem, the described selectable slice mapping designates sections of physical address space to a grouping of slices. Each thread is provided a map to find the slice(s) storing the physical addresses (e.g., data) it accesses. For example, slice subgroups are assigned to physical addresses based on an application's or thread's latency tolerance and/or memory usage. In this way, the described techniques reduce bandwidth requirements, allowing interconnect structures suitable for scaling to more processor cores or cache slices.

In some aspects, the techniques described herein relate to a processor comprising: slice hashing circuitry associated with a shared cache level of a hierarchy of one or more cache levels, the shared cache level including multiple slices accessible by a first thread of multiple threads running on a first processor core of multiple processor cores, the slice hashing circuitry configured to assign, based on latency requirements or data usage of the first thread, memory addresses used by the first thread to a first subset of multiple subsets of the multiple slices closest to the first processor core.

In some aspects, the techniques described herein relate to a processor wherein the multiple subsets of the multiple slices in the shared cache level include at least two of multiple one-slice groups, multiple two-slice groups, one or more four-slice groups, or one or more eight-slice groups.

In some aspects, the techniques described herein relate to a processor wherein the shared cache level includes eight slices and the multiple subsets include eight one-slice groups, four two-slice groups, two four-slice groups, and one eight-slice group.

In some aspects, the techniques described herein relate to a processor wherein each processor core of the multiple processor cores is assigned to at least two of: a particular one-slice group of the multiple one-slice groups, a particular two-slice group of the multiple two-slice groups, a particular four-slice group of the one or more four-slice groups, or a particular eight-slice group of the one or more eight-slice groups.

In some aspects, the techniques described herein relate to a processor wherein the slice hashing circuitry is configured to assign the memory addresses used by the first thread to the first subset by: assigning the memory addresses to a first logical slice group, the first logical slice group being a one-slice grouping, a two-slice grouping, a four-slice grouping, or an eight-slice grouping, and in response to an assignment of the first thread to the first processor core, assigning the memory addresses to the first subset of multiple subsets corresponding to the first logical slice group and the first processor core.

In some aspects, the techniques described herein relate to a processor wherein the slice hashing circuitry is further configured to: determine a first mapping of the data to the first subset of the multiple subsets in the shared cache level, determine a second mapping of the memory addresses to the multiple slices in the shared cache level, and assign the memory addresses to the first mapping in response to a determination that the memory addresses are assigned to a selectable mapping range of memory addresses.

In some aspects, the techniques described herein relate to a processor wherein the first mapping evenly distributes the memory addresses across the first subset of memory addresses and the second mapping evenly distributes the memory addresses and second memory addresses across the multiple slices.

In some aspects, the techniques described herein relate to a processor wherein the second memory addresses are assigned to the second mapping in response to a determination that the second memory addresses is not assigned to the selectable mapping range of memory addresses.

In some aspects, the techniques described herein relate to a processor wherein the first mapping includes a logical mapping that assigns the memory addresses to a first logical slice group, the first logical slice group being a one-slice grouping, a two-slice grouping, a four-slice grouping, or an eight-slice grouping, and a physical mapping that assigns the first logical slice group to the first subset based on an assignment of the first thread to the first processor core, the first subset including a same number of slices as the first logical slice group.

In some aspects, the techniques described herein relate to a processor wherein an application corresponding to the first thread assigns the first memory addresses to the selectable mapping range of memory addresses.

In some aspects, the techniques described herein relate to a processor wherein an operating system associated with the processor assigns the first memory addresses to the selectable mapping range of memory addresses based on the latency requirements or the data usage of the first thread.

In some aspects, the techniques described herein relate to a processor wherein the processor comprises a system on chip (SoC) with multiple processing cores.

In some aspects, the techniques described herein relate to a system comprising: multiple processor cores, wherein a first processor core of the multiple processor cores is assignable to a first thread of a first application and a second processor core is assignable to a second thread of a second application, a shared cache level of a hierarchy of one or more cache levels including multiple slices accessible by the multiple processor cores, and slice hashing circuitry associated with the shared cache level configured to assign first memory addresses used by the first thread to a first subset of the multiple slices closest to the first processor core and second memory addresses used by the second thread to a second subset of the multiple slices closest to the second processor core.

In some aspects, the techniques described herein relate to a system the first memory addresses have a same size of the second memory addresses and the first subset of multiple slices includes a different number of slices than the second subset of multiple slices.

In some aspects, the techniques described herein relate to a system wherein the multiple subsets of the multiple slices in the shared cache level include at least two of multiple one-slice groups, multiple two-slice groups, one or more four-slice groups, or one or more eight-slice groups.

In some aspects, the techniques described herein relate to a system wherein the slice hashing circuitry is further configured to: determine, based on a first slice hashing technique, a first mapping of the first memory addresses to the first subset and the second memory addresses to the second subset, determine, based on a second slice hashing technique, a second mapping of the first memory addresses and the second memory addresses to the multiple slices in the shared cache level, assign the first memory addresses to the first mapping in response to a determination that the first application is assigned to a selectable mapping range of memory addresses, and assign the second memory addresses to the second mapping in response to a determination that the second application is not assigned to the selectable mapping range of memory addresses.

In some aspects, the techniques described herein relate to a system wherein the first mapping includes: a logical mapping that assigns the first memory addresses to a first logical slice group, the first logical slice group being a one-slice grouping, a two-slice grouping, a four-slice grouping, or an eight-slice grouping and a physical mapping that assigns the first logical slice group to the first subset based on an assignment of the first thread to the first processor core, the first subset including a same number of slices as the first logical slice group.

In some aspects, the techniques described herein relate to a system wherein an operating system associated with the multiple processor cores assigns the first application to the selectable mapping range of memory addresses based on latency requirements or data usage of the first application.

In some aspects, the techniques described herein relate to a system wherein the shared cache level is a level three cache.

In some aspects, the techniques described herein relate to a method comprising: determining a first mapping of memory addresses to a first subset of multiple slices in a shared cache level of a hierarchy of one or more cache levels, the memory addresses used by a thread running on a first processor core of multiple processor cores, the first subset of multiple slices being closer to the first processor core than a second subset of multiple slices with a same number of slices, determining a second mapping of the memory addresses to the multiple slices in the shared cache level, and assign the memory addresses to the first mapping in response to a determination that the memory addresses is assigned to a selectable mapping range of memory addresses.

FIG. 1 is a block diagram of a non-limiting example system 100 to implement selectable slice mapping for shared caches. The system 100 includes a device 102 having a processor 104 and a memory system 106 having volatile memory 108 and non-volatile memory 110. The device 102 is configurable in a variety of ways. Examples of device 102 include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. In various implementations, device 102 is configured as any one or more of those devices listed above and/or a variety of other devices without departing from the spirit or scope of the described techniques.

In accordance with the described techniques, the processor 104 and the memory system 106 are coupled to one another via one or more wired and/or wireless connections. Example wired connections include, but are not limited to, buses (e.g., a data bus), interconnects, traces, and planes. The processor 104 is an electronic circuit that reads, translates, and executes workloads of a program, e.g., an application, operating system, virtual machine, container, and so on. Examples of processor 104 include, but are not limited to, systems on chip (SoCs), central processing units (CPUs), graphics processing units (GPUs), Field Programmable Gate Arrays (FPGAs), Application Specific Integrated Circuits (ASICs), digital signal processors (DSPs), systems on chip (SoCs), and accelerator devices. As another example, the processor 104 is a processor core, and the device 102 includes multiple processor cores (e.g., four or eight).

The volatile memory 108 and the non-volatile memory 110 are devices and/or systems used to store information, such as for use by the processor 104. By way of example, device 102 includes a memory module (e.g., a Transflash memory module, a single in-line memory module (SIMM), or a dual in-line memory module (DIMM)), and the memory module is a circuit board (e.g., a printed circuit board) on which the volatile memory 108 and the non-volatile memory 110 are mounted. Further, the volatile memory 108 and the non-volatile memory 110 correspond to semiconductor memory, where data is stored within memory cells on one or more integrated circuits.

Broadly, the volatile memory 108 retains data as long as the device 102 is connected to power, and the data is accessible relatively faster than the non-volatile memory 110. Examples of volatile memory 108 include random-access memory (RAM), dynamic random-access memory (DRAM), synchronous dynamic random-access memory (SDRAM), and static random-access memory (SRAM).

The non-volatile memory 110 retains data even after the device 102 is disconnected from power, but is accessible relatively slower than the volatile memory 108. Examples of non-volatile memory include solid state disks (SSD), flash memory, read-only memory (ROM), programmable read-only memory (PROM), erasable programmable read-only memory (EPROM), and electronically erasable programmable read-only memory (EEPROM).

As shown, the processor 104 includes one or more execution units 112, one or more load-store units 114, and a cache system 116 coupled to one another via wired and/or wireless connections. An execution unit 112 is representative of functionality implemented in hardware (e.g., electronic circuitry) of the processor 104 to perform specific types of workloads, such as arithmetic and logic operations. Further, a load-store unit 114 is representative of functionality implemented in the hardware of the processor 104 to perform load operations and store operations as part of a workload. The execution units 112 and the load-store units 114 perform respective operations based on requests received through the execution of software programs, e.g., applications, operating systems, virtual machines, containers, and so on. By way of example, requests are generated and forwarded to the execution units 112 and/or the load-store units 114 by a control unit (not depicted) of the processor 104.

Load requests instruct the load-store units 114 to load data from the cache system 116, the volatile memory 108, and/or the non-volatile memory 110 into registers of the execution units 112. Once loaded into registers, requests (e.g., arithmetic and logic requests) are executable by the execution units 112 to perform corresponding operations (e.g., arithmetic and logic operations) on the data. Store requests instruct the load-store units 114 to store data from the registers (e.g., after the data has been processed by the execution units 112) in the cache system 116, the volatile memory 108, and/or the non-volatile memory 110. Load requests and store requests issued by the load-store units 114 as part of executing a runtime program are referred to herein collectively as "access requests 118."

As illustrated, the cache system 116 includes a hierarchy of multiple cache levels 120, including a level one cache 122, a level two cache 124, and a last level cache 126, also referred to as a level three (L3) cache or a shared level cache. By way of example, processor 104 is a multi-core processor, and each respective processor core includes the level one cache 122 and level two cache 124 that are exclusively used by the respective processor core. Furthermore, the processor 104 includes the last level cache 126, which is shared among the multiple processor cores.

The cache system 116 corresponds to semiconductor memory where data is stored within memory cells on one or more integrated circuits. The higher cache levels (e.g., level one cache 122) are accessible (e.g., for loading and/or storing data) relatively faster than the lower cache levels (e.g., the last level cache 126). Lower cache levels in the hierarchy of cache levels generally have greater memory capacity than higher levels. In other implementations, the cache system 116 includes differing numbers of cache levels and different hierarchical structures without departing from the spirit or scope of the described techniques. For example, the processor cores share a different level cache or multiple level caches in another implementation.

The cache system 116 is accessible (e.g., for loading and/or storing data in response to the access requests 118) relatively faster than the memory system 106, which is located outside the hierarchy of the cache system 116. The various memory sources of processor 104 are ordered from fastest access speed to slowest access speed in the following order: (1) the level one cache 122, (2) the level two cache 124, (3) the last level cache 126, (4) the volatile memory 108, and (5) the non-volatile memory 110. As a result, a load-store unit 114 executes a load request that includes a memory address by progressively checking the memory sources for the identified data in the aforementioned order. If the data is present in a memory source, the load-store unit 114 loads the data from that memory source into the registers, and if not, the load-store unit 114 proceeds to check whether the data is present in the next memory source.

The last level cache 126 is divided into multiple slices 128 (e.g., four or eight slices) that act as subsections of the last level cache 126. The slices 128 are similar to smaller caches that work together to improve the overall efficiency and performance of the last level cache 126. By distributing data access across the slices 128, the overall bandwidth of the last level cache 126 is used more efficiently.

The cache system 116 also includes a slice hashing module 130, which is representative of functionality implemented in the hardware (e.g., electronic circuitry) of the cache system 116 to map the access requests from the processor cores or execution units thereof to one or more slices 128 within the last level cache 126. The slice hashing module 130 maps memory addresses to the slices 128 using a hash function, which aims to distribute cache lines across the slices 128 evenly. In one implementation, the slice hashing module 130 is located at the connection point between the level two cache 124 and the network-on-chip or integrated into a cache controller associated with the last level cache 126 and/or the cache system 116. For example, slice hashing module 130 is electronic circuitry and/or logic at the connection point between the level two cache 124 and the network-on-chip (e.g., the communication infrastructure integrating the processor 104, memory controllers, and cache system 116) that maps physical address sections to individual slices 128 or slice groupings.

Execution units 112 or threads of the processor 104 generally do not share data. For example, threads running on different processing cores (e.g., from different processes or applications) rarely share data. If threads are from the same application or processing core, the threads are generally organized to minimize the amount of shared data to allow for the performance benefits of parallelism. Based on these observations, slice hashing module 130 implements techniques to map the address spaces a thread uses to the slices 128 closer to the respective processing core to improve the thread's latency. In addition, the described selectable slice mapping reduces interconnect bandwidth usage to indirectly improve the performance of other threads and allow interconnect topologies with less area overhead. Additional details and operations of the slices 128 and the slice hashing module 130 are described in relation to FIGS. 2 through 6.

Figure 2:
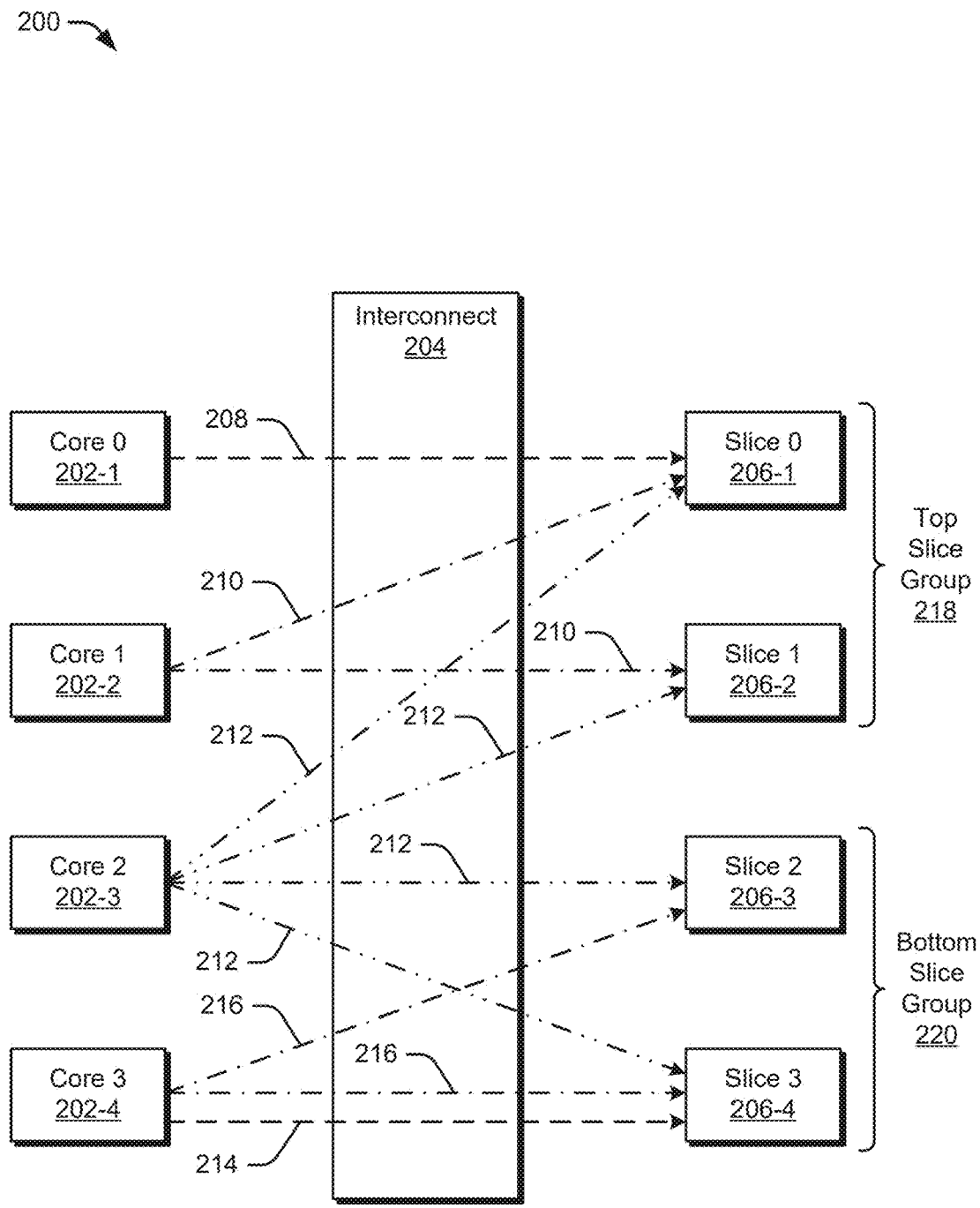
FIG. 2 depicts a non-limiting example in which selectable slice mapping techniques are implemented to distribute slices in a shared cache level dynamically.

FIG. 2 depicts a non-limiting example 200 in which selectable slice mapping techniques are implemented to dynamically distribute access requests to slices in a shared cache level. As shown, example 200 includes multiple processor cores 202 of a processor (e.g., the processor 104 of FIG. 1), an interconnect 204, and multiple slices 206 of a shared cache level (e.g., the last level cache 126 of FIG. 1). Example 200 is illustrated as including four processor cores 202 and four slices 206. Other implementations include fewer or additional processor cores 202 and/or slices 206.

The interconnect 204 communicatively couples the processor cores 202 and the slices 206. In particular, the interconnect 204 allows processor cores 202 to access data stored in the slices 206 of a shared cache level. The interconnect 204 provides pathways (e.g., shared or dedicated), including a data bus and/or network-on-chip, for each processor core 202 to access the slices 206. The bandwidth of the interconnect 204 represents the amount of data transferrable between the processor cores 202 and the slices 206 per unit time. The latency of the interconnect 204 refers to the time it takes for data to travel between the processor cores 202 and the slices 206, with lower latency translating to faster communication and improved overall processor performance.

As described above, the slice hashing module 130 (not illustrated in FIG. 2) employs selectable slice mapping within the interconnect 204 or at the connection port between level two caches 124 to the interconnect 204 to map physical address spaces a thread uses to one or more slices 206 closer to the processor core 202 on which the thread runs. For example, consider a first thread ("Thread 0") of a first processor core 202-1 ("Core 0") processes a small amount of data, but memory latency is critical. To satisfy the latency requirements, the memory addresses used by Thread 0 are mapped to a first slice 206-1 ("Slice 0") using a data path 208 within the interconnect 204. A second thread ("Thread 1") of a second processor core 202-2 ("Core 1") has a larger data footprint. To satisfy latency and system bandwidth requirements, the memory addresses used by Thread 1 are mapped to the first slice 206-1 ("Slice 0") and a second slice 206-2 ("Slice 1") using a data path 210 within the interconnect 204. Slice 0 and Slice 1 form a top slice group 218.

In contrast, a third thread ("Thread 2") of a third processor core 202-3 ("Core 2") processes a relatively large amount of data, but memory latency is not critical. To satisfy system bandwidth requirements, the memory addresses used by Thread 2 are mapped to each slice 206, including the first slice 206-1 ("Slice 0"), the second slice 206-2 ("Slice 1"), a third slice 206-3 ("Slice 2"), and a fourth slice 206-4 ("Slice 3"), using a data path 212 within the interconnect 204. Slice 2 and Slice 3 form a bottom slice group 220.

A memory section (e.g., a range of memory addresses) associated with a fourth thread ("Thread 3") of a fourth processor core 202-4 ("Core 3") is latency critical, while the remaining memory addresses are not. As a result, the critical memory addresses are mapped to Slice 3 using a data path 214 within the interconnect 204. The non-critical memory addresses used by Thread 3 are mapped to Slice 2 and Slice 3 using a data path 216 within the interconnect 204.

To support selective mapping, slices 206 of a shared cache level are organized into predefined slice groupings, including one-slice groupings (G1 groups), two-slice groupings (G2 groups), and a four-slice grouping (G4 group). In the illustrated example, there are four G1 groups, two G2 groups, and one G4 group. In other implementations, additional or fewer slice groupings are predefined based on the number of slices 206. Within a group of multiple slices (e.g., G2 or G4 groups), conventional slice hashing techniques (e.g., even distribution) are applied to distribute the memory addresses accessed by a thread of a particular processor core 202.

As a result of the described selectable slice mapping, the bandwidth requirement across the two-slice groups (e.g., the top slice group 218 and the bottom slice group 220) is lower than that of the scenario in which each processor core 202 accesses each slice 206. The bandwidth improvement increases as the number of slices 206 increases in other implementations. In addition, the corresponding processor cores 202 are mapped to nearer or the nearest slices 206 to reduce tail latency, better satisfying latency requirements for latency-critical threads. The mapping of physical addresses to slice groupings using the described selectable slice mapping is described in greater detail with respect to FIG. 3, while the slice mapping logic at each port connecting to the interconnect 204 is described in relation to FIG. 4.

Figure 3:
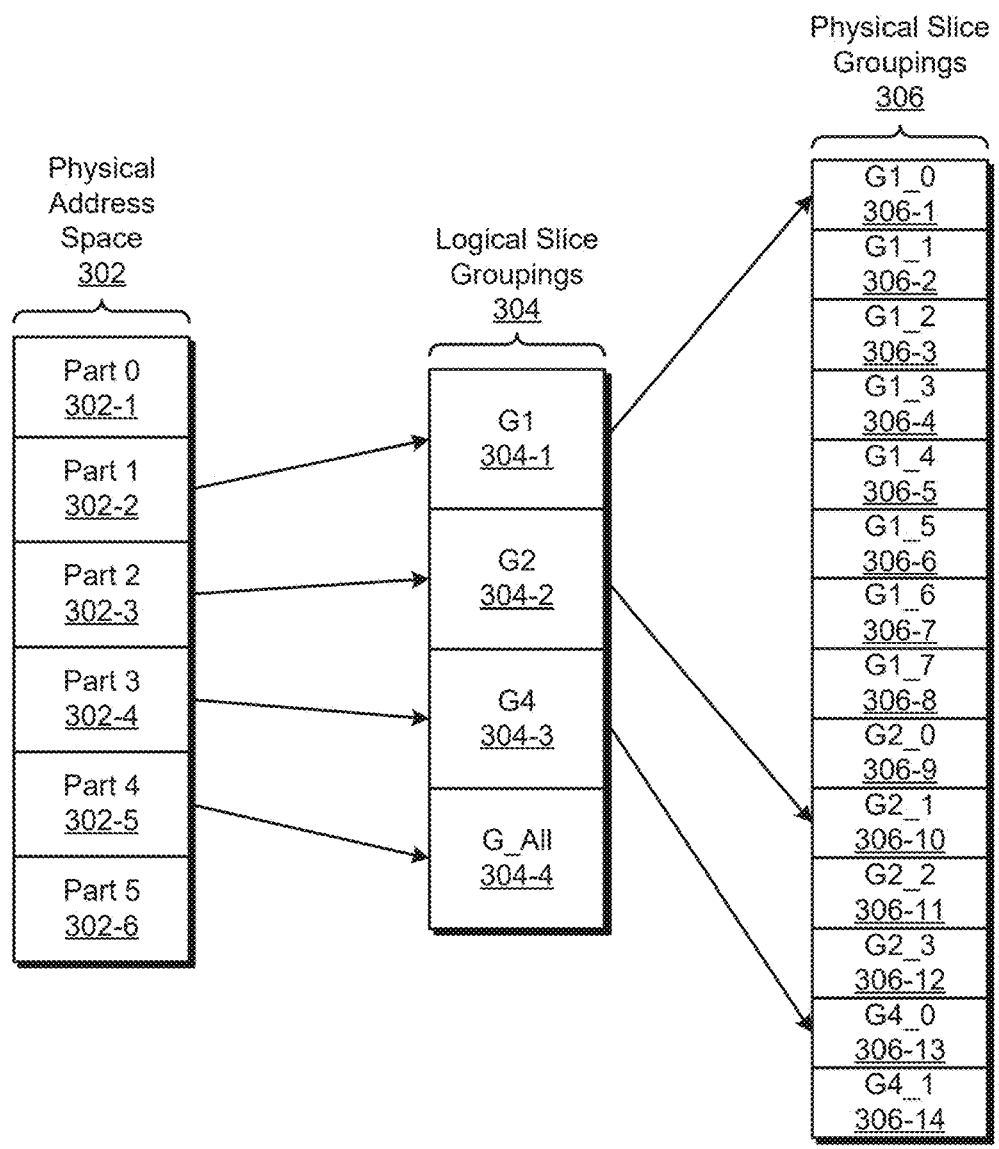
FIG. 3 depicts an example of two-level selectable slice mapping.

FIG. 3 depicts an example 300 of two-level selectable slice mapping. Example 300 includes physical address space 302, logical slice groupings 304, and physical slice groupings 306.

The physical address space 302 refers to the set of memory addresses that a particular thread can directly access within the memory (e.g., the memory system 106 of FIG. 1). Some parts of the physical address space 302 are designated for selectable slice mapping (e.g., six parts in FIG. 3), while the rest are distributed using conventional hashing techniques. For example, memory addresses in a second part 302-2 ("Part 1"), third part 302-3 ("Part 2"), fourth part 302-4 ("Part 3"), and fifth part 302-5 ("Part 4") use selectable slice mapping, while memory addresses in a first part 302-1 ("Part 0") and a sixth part 302-6 ("Part 5") are not currently in use.

As described above, the logical slice groupings 304 provide predefined slice group sizes. For example, the logical slice groupings 304 include a one-slice grouping (G1) 304-1, a two-slice grouping (G2) 304-2, a four-slice grouping (G4) 304-3, and a all-slice or eight-slice grouping (G_All). Each section of the physical address space 302 designated for selectable slice mapping (e.g., Part 1, Part 2, Part 3, or Part 4) can be logically mapped or assigned to any logical slice groupings 304. In other words, Part 1 is mappable to G1, G2, G4, or G_All. In example 300, Part 1 is mapped to G1, Part 2 to G2, Part 3 to G4, and Part 4 to G_All. Part 4 behaves like other parts not designated for selectable slice mapping. This first-level mapping is logical or location-independent because it does not identify a particular slice group (e.g., slice ID) for the address spaces.

In the second level of mapping, the selectable mapping sections of the physical address space 302 are physically mapped to physical slice groupings 306. The physical mapping from a logical slice grouping to a physical slice grouping 306 is fixed for each processor core, while the logical mapping to logical slice groupings 304 is configurable depending on which memory sections are used by the threads of a particular processor core and the latency requirements of the threads (or the associated applications). In other words, Part 1 is mapped to the G1 physical slice grouping 306 associated with the processor core of the thread accessing these memory addresses. In example 300, Part 1 is physically mapped to the first physical slice group (G1_0) because the accessing core is Core 0. Part 2 is physically mapped to the tenth physical slice group (G2_1) (i.e., the second two-slice group) and Part 3 to the 13$^{th}$ physical slice group (G4_0) (i.e., the first four-slice group). Part 4 is mapped to each slice (i.e., G1_0 through G1_7).

Figure 4:
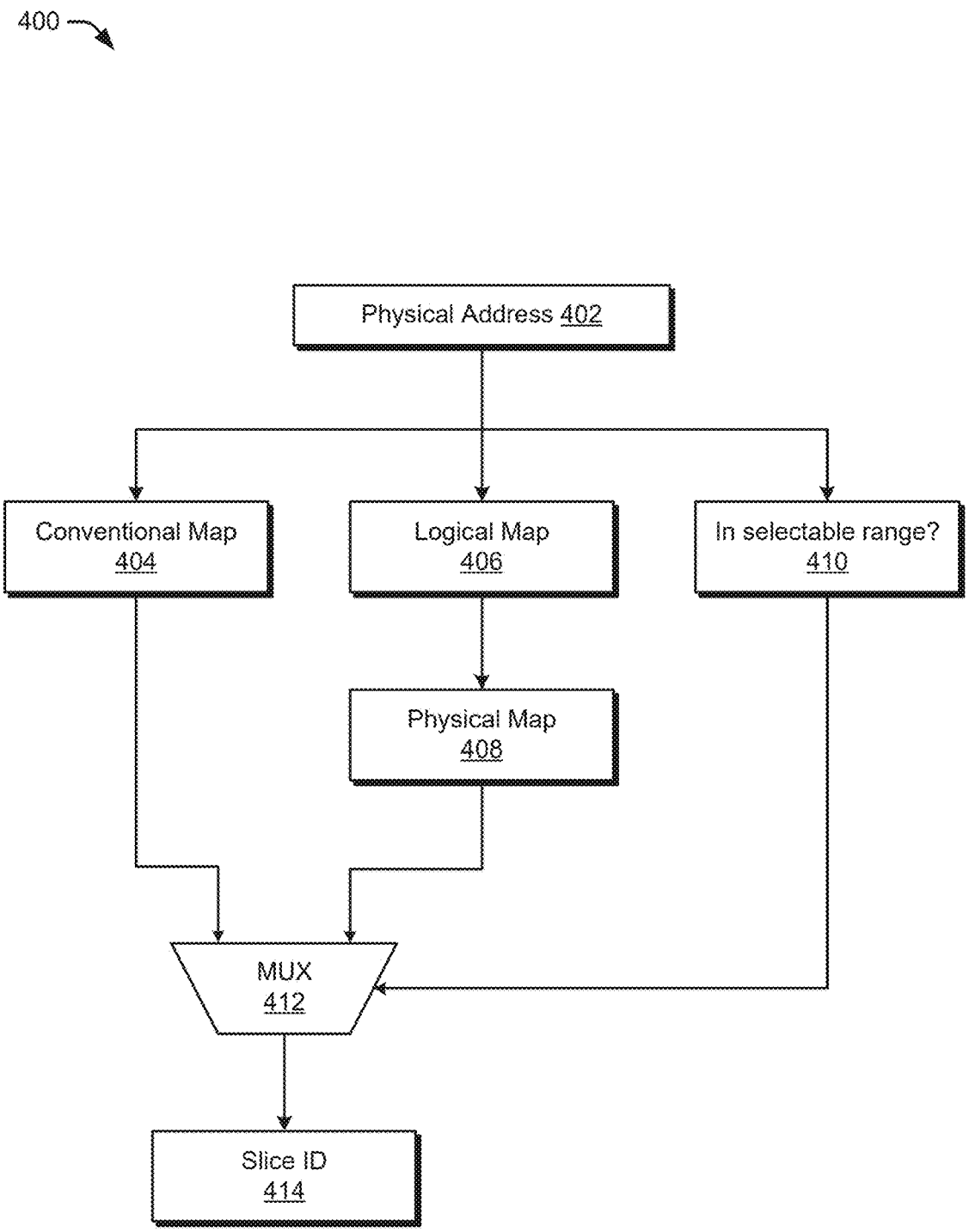
FIG. 4 depicts an example procedure to implement selectable slice mapping.

FIG. 4 depicts an example procedure 400 to implement selectable slice mapping. In particular, procedure 400 illustrates the mapping logic at each processor core to implement the described selectable slice mapping techniques. Each physical address 402 is mapped to a single slice to avoid inconsistencies.

In one implementation, the mapping for a particular processor core defaults to conventional slice hashing and a memory controller or an operating system (OS) loads a different mapping while assigning a thread to a particular processor core.

Each port of a processor core on the interconnect contains a mapping from a physical address 402 to a slice identification (ID) 414. For each physical address 402 of a memory request (e.g., an access request to the last level cache 126), the OS determines a conventional map 404 that implements conventional slice hashing as described above. The OS also determines a selectable hashing, which includes a logical map 406 and a physical map 408, for each physical address 402 of the memory request. If the physical address 402 falls within a selectable mapping range used by the core (block 410), the selectable slice mapping (e.g., as represented by the logical map 406 and the physical map 408) is selected by the multiplexer 412, which represents logical circuitry or hardware to determine which slice mapping to utilize. However, if the physical address 402 does not fall within a selectable mapping range, conventional hashing in the conventional map 404 is used.

The selectable hashing includes two steps. While the physical map 408 is fixed for each processor core, the logical map 406 is configurable depending on which memory sections are used by the threads assigned to the processor core and latency requirements. The procedure 400 for the mapping process may take several cycles to be determined, which can be performed successively as the access request propagates through higher cache levels to avoid extra latency.

The operating system (OS) manages the physical address space and thus enables the described selectable slice mapping. The slice group attribute (e.g., selectable mapping range or conventional mapping range) of a memory page is annotated to the Page Attribute Table (PAT) or memory type range registers (MTRRs) in a similar manner as making a page uncacheable. The OS allocates a page frame and updates the page tables during demand paging. If selectable slice mapping is enabled, the OS also updates the slice hash of the core where the thread triggering the page fault is on through a Control Register. The OS observes and assigns groups for bandwidth requirement reduction without user intervention in at least one implementation. During thread scheduling, the OS places a thread within the group of processor cores such that the address ranges with selectable slice hashing are consistent with other threads sharing those ranges.

Figure 5:
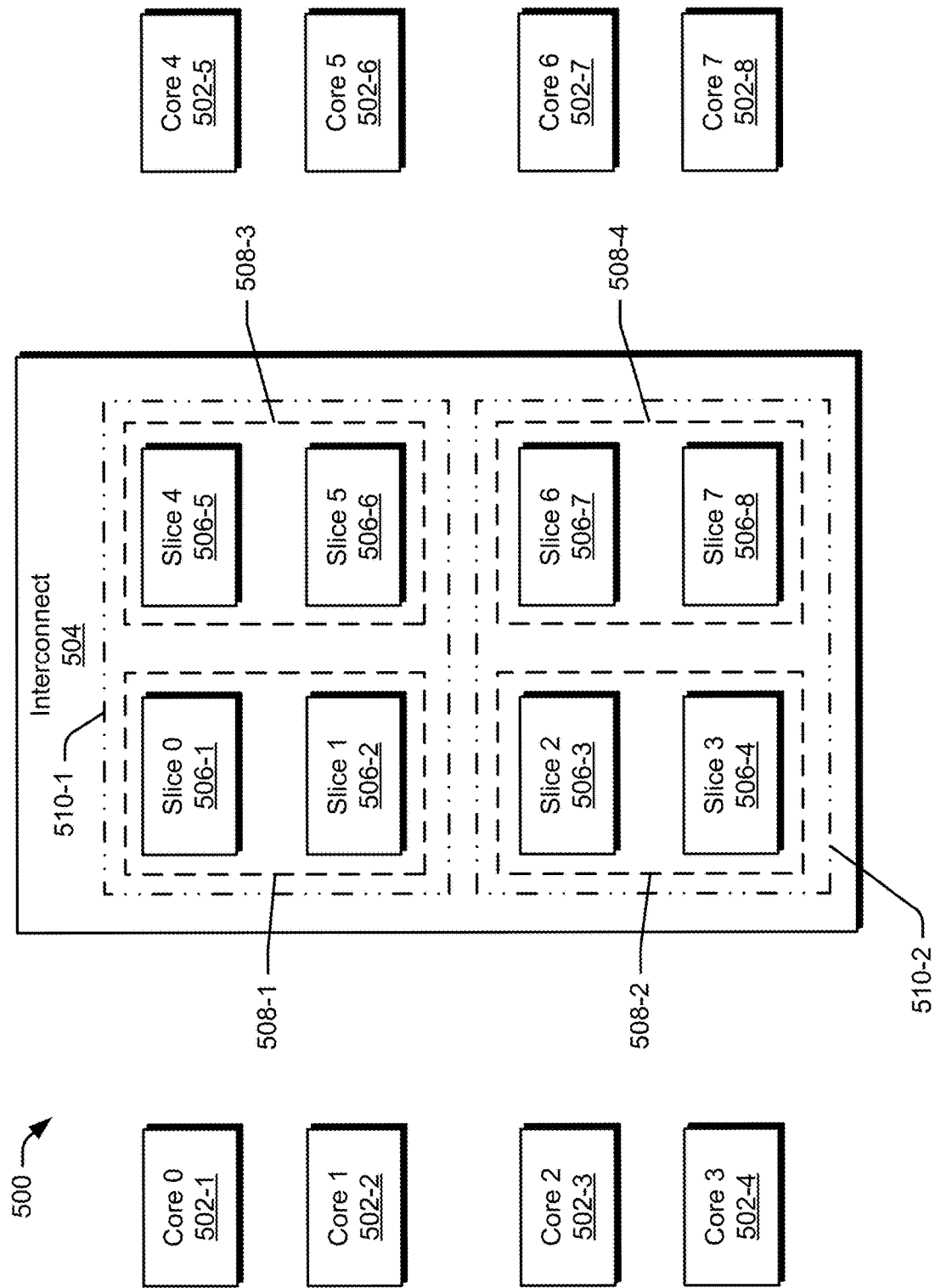
FIG. 5 depicts a non-limiting example in which selectable slice mapping techniques are implemented to distribute slices in a shared cache level.

FIG. 5 depicts a non-limiting example 500 in which selectable slice mapping techniques are implemented to distribute access requests to slices in a shared cache level. As shown, example 500 includes multiple processor cores 502 of a processor (e.g., the processor 104 of FIG. 1), an interconnect 504, and multiple slices 506 of a shared cache level (e.g., the last level cache 126 of FIG. 1). Example 500 is illustrated as including eight processor cores 502 and eight slices 506. Other implementations include fewer or additional processor cores 502 and/or slices 506.

The interconnect 504 communicatively couples the processor cores 502 and the slices 506. In particular, the interconnect 504 allows processor cores 502 to access data stored in the slices 506 of a shared cache level. As described above, the slice hashing module 130 (not illustrated in FIG. 2) employs selectable slice mapping within the interconnect 504 to map address spaces a thread uses to one or more slices 506 closer to the processor core 502 on which the thread is run.

As described above, the first level of mapping is logical or location-independent, while the second level is physical. In example 500, the eight slices 506 are organized as eight G1 slices (e.g., the first slice 506-1 ("slice 0") through the eighth slice 506-8 ("slice 7")), four G2 slices 508 (e.g., a top-left two-slice group 508-1, which includes slices 506-1 ("slice 0") and 506-2 ("slice 1")), two G4 slices (e.g., a top four-slice group 510-1, which includes slices 506-1 ("slice 0"), 506-2 ("slice 1"), 506-5 ("slice 4"), and 506-6 ("slice 5")), and one G8 slice, which includes all eight slices 506. In the first level of mapping, the operating system assigns the physical addresses of the last level cache 126 to a logical slice grouping. In other words, each physical address is assigned to the G1, G2, G4, or G8 grouping of slices. For example, a physical address or a memory section (e.g., a range of physical addresses) logically mapped to G2, which is physically mappable to one of the four G2 groups 508-1, 508-2, 508-3, or 508-4.

The second level of mapping occurs when the operating system assigns a thread that uses a memory section to a particular processor core 502. Each processor core is physically associated with a particular G1, G2, or G4 grouping. For example, the first processor core 502-1 ("Core 0") is associated with slice 506-1 ("Slice 0") for G1 grouping, G2 group 508-1, and G4 group 510-1. Consider that Thread A using Memory Section 2, which is logically assigned to the G2 grouping, runs on the first processor core 502-1 ("Core 0"), Section 2 is then physically mapped to G2 group 508-1. If Thread A runs on the eighth processor core 502-8 ("Core 7"), Section 2 is physically mapped to G2 group 508-4. The operating system ensures that two threads using the same selectable memory section are assigned such that the physical mapping of that memory section is consistent.

In this way, instead of imposing physical address distribution over every slice 506 indiscriminately, the described selectable slice mapping techniques allow an application to suggest how its memory footprint should be distributed to the operating system. The selectable mapping improves application performance by assigning latency-sensitive data close to the processor core 502. In addition, interconnect bandwidth usage is reduced, indirectly improving the performance of other applications and allowing interconnect topologies with less area overhead. Selectable slice mapping also improves system security by enabling applications to instruct the operating system to put sensitive data such as page tables in selectable slice hashing and taking advantage of cache isolation techniques. Lastly, the described techniques reduce bandwidth usage to off-chip memory (e.g., the memory system 106) because operating systems know where memory segments with selectable slice hashing are used and utilize this information to avoid unnecessary probe requests.

Figure 6:
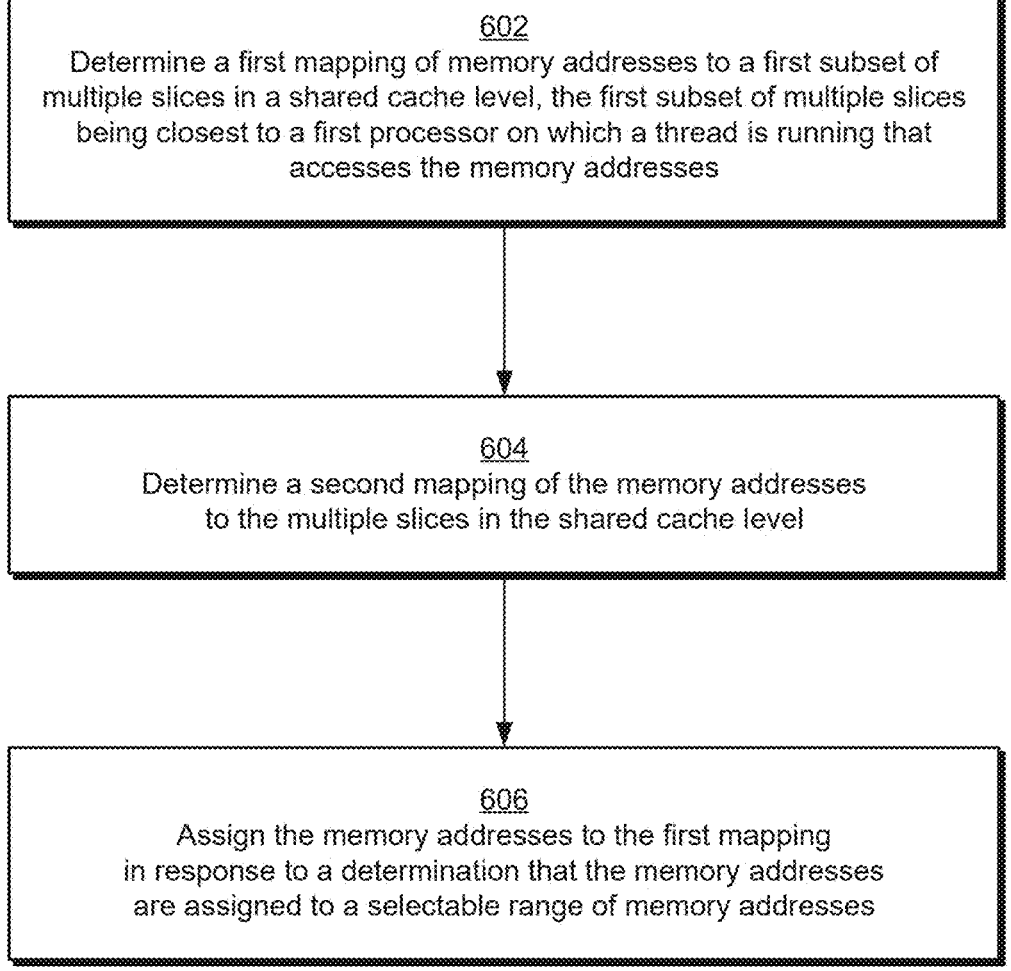
FIG. 6 depicts a procedure in an example implementation of selectable slice mapping.

FIG. 6 depicts a procedure 600 in an example implementation of selectable slice mapping. In procedure 600, slice hashing circuitry determines a first mapping of memory addresses to a first subset of multiple slices in a shared cache level of a hierarchy of multiple cache levels (block 602). The memory addresses are used or accessed (currently or soon) by a thread running on a first processor core of multiple processor cores. The first subset of multiple slices is closer to the first processor core than a second subset of multiple slices with the same number of slices. For example, the first subset of slices is a group of two slices (G2) and G2 slices closest to the first processor core are assigned to the first processor core in the first mapping using the described selectable slice mapping techniques.

The slice hashing circuitry also determines a second mapping of the memory addresses to the multiple slices in the shared cache level (block 604). For example, the slice hashing circuitry assigns the memory addresses to one or more slices based on conventional slice hashing techniques that distribute memory addresses in the shared cache level across multiple slices. Based on a determination that the memory addresses are assigned to a selectable mapping range of memory addresses or physical addresses, the slice hashing circuitry assigns the memory addresses to the first mapping (block 606).

Figure 7:
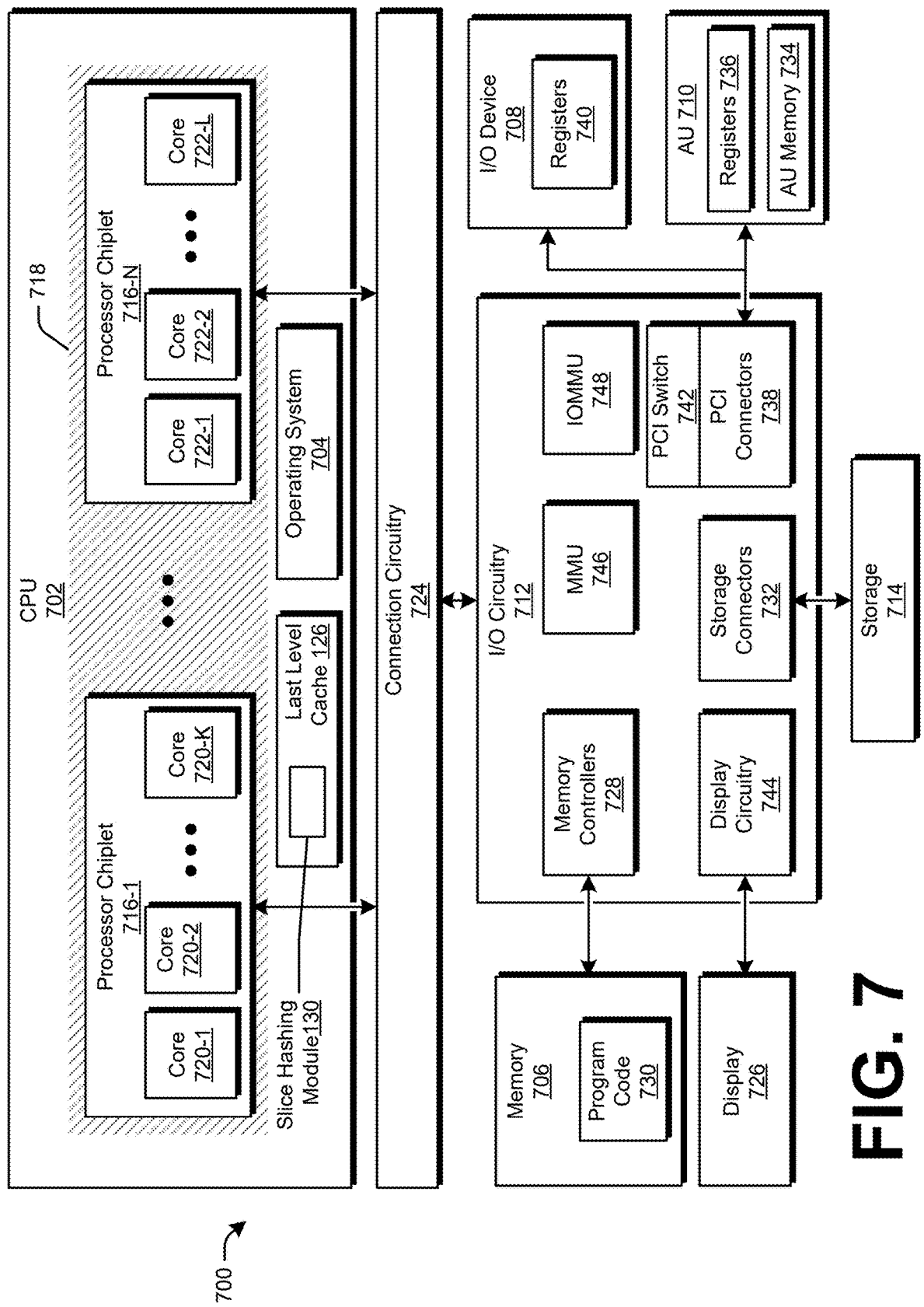
FIG. 7 is a block diagram of a processing system configured to execute one or more applications in accordance with one or more implementations.

FIG. 7 is a block diagram of a processing system configured to execute one or more applications in accordance with one or more implementations.

In particular, FIG. 7 includes a processing system 700 configured to execute one or more applications, such as computing applications (e.g., machine-learning applications, neural network applications, high-performance computing applications, databasing applications, gaming applications), graphics applications, and the like. Examples of devices in which the processing system 700 is implemented include but are not limited to a server computer, personal computer (e.g., desktop or tower computer), smartphone or another wireless phone, tablet or phablet computer, notebook computer, laptop computer, wearable device (e.g., smartwatch, augmented reality headset or device, virtual reality headset or device), entertainment device (e.g., gaming console, portable gaming device, streaming media player, digital video recorder, music or another audio playback device, television, set-top box), Internet of Things (IoT) device, automotive computer or computer for another type of vehicle, networking device, medical device or system, and other computing devices or systems.

In the illustrated example, the processing system 700 includes a central processing unit (CPU) 702. In one or more implementations, the CPU 702 is configured to run an operating system (OS) 704 that manages the execution of applications. For example, the OS 704 is configured to schedule the execution of tasks (e.g., instructions) for applications, allocate portions of resources (e.g., system memory 706, CPU 702, input/output (I/O) device 708, accelerator unit (AU) 710, storage 714) for the execution of tasks for the applications, provide an interface to I/O devices (e.g., I/O device 708) for the applications, or any combination thereof.

The CPU 702 includes one or more processor chiplets 716, which are communicatively coupled by a data fabric 718 in one or more implementations. Each processor chiplet 716, for example, includes one or more processor cores 720, 722 configured to execute one or more series of instructions concurrently, also referred to herein as "threads" or workloads, for an application. Further, the data fabric 718 communicatively couples each processor chiplet 716-N of the CPU 702 such that each processor core (e.g., processor cores 720) of a first processor chiplet (e.g., 716-1) is communicatively coupled to each processor core (e.g., processor cores 722) of one or more other processor chiplets 716.

Though the example embodiment in FIG. 7 shows a first processor chiplet (716-1) having three processor cores (720-1, 720-2, 720-K) representing a K number of processor cores 722 and a second processor chiplet (716-N) having three processor cores (e.g., 722-1, 722-2, 722-L) representing an L number of processor cores 722, in other implementations (L being an integer number greater than or equal to one), each processor chiplet 716 may have any number of processor cores 720, 722. For example, each processor chiplet 716 can have the same number of processor cores 720, 722 as one or more other processor chiplets 716, a different number of processor cores 720, 722 as one or more other processor chiplets 716, or both.

In this example, the last level cache 126 is depicted in the CPU 702 and is configured to be shared by the processor cores 720 and the processor cores 722. In variations, however, the last level cache 126 is included in the processor chiplets 716 to be shared by the corresponding processor cores 720. The last level cache 126 also includes the slice hashing module 130. In at least one implementation, the last level cache 126 with the slice hashing module 130 is included in at least two of the depicted components of the processing system 700 (e.g., each processor chiplet 716).

Examples of connections that are usable to implement the data fabric 718 include but are not limited to buses (e.g., a data bus, a system, an address bus), interconnects, memory channels, and silicon vias, traces, and planes. Other example connections include optical connections, fiber optic connections, and/or connections or links based on quantum entanglement.

Additionally, within the processing system 700, the CPU 702 is communicatively coupled to an I/O circuitry 712 by a connection circuitry 724. For example, each processor chiplet 716 of the CPU 702 is communicatively coupled to the I/O circuitry 712 by the connection circuitry 724. The connection circuitry 724 includes, for example, one or more data fabrics, buses, buffers, queues, and the like. The I/O circuitry 712 is configured to facilitate communications between two or more components of the processing system 700 such as between the CPU 702, system memory 706, display 726, universal serial bus (USB) devices, peripheral component interconnect (PCI) devices (e.g., I/O device 708, AU 710), storage 714, and the like.

As an example, system memory 706 includes any combination of one or more volatile memories and/or one or more non-volatile memories, examples of which include dynamic random-access memory (DRAM), static random-access memory (SRAM), non-volatile RAM, and the like. To manage access to the system memory 706 by CPU 702, the I/O device 708, the AU 710, and/or any other components, the I/O circuitry 712 includes one or more memory controllers 728. The memory controllers 728, for example, include circuitry configured to manage and fulfill memory access requests issued from the CPU 702, the I/O device 708, the AU 710, or any combination thereof. Examples of such requests include read requests, write requests, fetch requests, pre-fetch requests, or any combination thereof.

That is to say, the memory controllers 728 are configured to manage access to the data stored at one or more memory addresses within the system memory 706, such as by CPU 702, I/O device 708, and/or AU 710.

When an application is to be executed by processing system 700, the OS 704 running on the CPU 702 is configured to load at least a portion of program code 730 (e.g., an executable file) associated with the application from, for example, a storage 714 into system memory 706. This storage 714, for example, includes a non-volatile storage such as a flash memory, solid-state memory, hard disk, optical disc, or the like configured to store program code 730 for one or more applications.

To facilitate communication between the storage 714 and other components of processing system 700, the I/O circuitry 712 includes one or more storage connectors 732 (e.g., universal serial bus (USB) connectors, serial AT attachment (SATA) connectors, PCI Express (PCIe) connectors) configured to communicatively couple storage 714 to the I/O circuitry 712 such that I/O circuitry 712 is capable of routing signals to and from the storage 714 to one or more other components of the processing system 700.

In association with executing an application, in one or more scenarios, the CPU 702 is configured to issue one or more instructions (e.g., threads) to be executed for an application to the AU 710. The AU 710 is configured to execute these instructions by operating as one or more vector processors, coprocessors, graphics processing units (GPUs), general-purpose GPUs (GPGPUs), non-scalar processors, highly parallel processors, artificial intelligence (AI) processors (also known as neural processing units, or NPUs), inference engines, machine-learning processors, other multithreaded processing units, scalar processors, serial processors, programmable logic devices (e.g., field-programmable logic devices (FPGAs)), or any combination thereof.

In at least one example, the AU 710 includes one or more compute units that concurrently execute one or more threads of an application and store data resulting from the execution of these threads in AU memory 734. This AU memory 734, for example, includes any combination of one or more volatile memories and/or non-volatile memories, examples of which include caches, video RAM (VRAM), or the like. In one or more implementations, these compute units are also configured to execute these threads based on the data stored in one or more physical registers 736 of the AU 710.

To facilitate communication between the AU 710 and one or more other components of processing system 700, the I/O circuitry 712 includes or is otherwise connected to one or more connectors, such as PCI connectors 738 (e.g., PCIe connectors) each including circuitry configured to communicatively couple the AU 710 to the I/O circuitry such that the I/O circuitry 712 is capable of routing signals to and from the AU 710 to one or more other components of the processing system 700. Further, the PCIe connectors 738 are configured to communicatively couple the I/O device 708 to the I/O circuitry 712 such that the I/O circuitry 712 is capable of routing signals to and from the I/O device 708 to one or more other components of the processing system 700.

By way of example and not limitation, the I/O device 708 includes one or more keyboards, pointing devices, game controllers (e.g., gamepads, joysticks), audio input devices (e.g., microphones), touch pads, printers, speakers, headphones, optical mark readers, hard disk drives, flash drives, solid-state drives, and the like. Additionally, the I/O device 708 is configured to execute one or more operations, tasks, instructions, or any combination thereof based on one or more physical registers 740 of the I/O device 708. In one or more implementations, such physical registers 740 are configured to maintain data (e.g., operands, instructions, values, variables) indicating one or more operations, tasks, or instructions to be performed by the I/O device 708.

To manage communication between components of the processing system 700 (e.g., AU 710, I/O device 708) that are connected to PCI connectors 738, and one or more other components of the processing system 700, the I/O circuitry 712 includes PCI switch 742. The PCI switch 742, for example, includes circuitry configured to route packets to and from the components of the processing system 700 connected to the PCI connectors 738 as well as to the other components of the processing system 700. As an example, based on address data indicated in a packet received from a first component (e.g., CPU 702), the PCI switch 742 routes the packet to a corresponding component (e.g., AU 710) connected to the PCI connectors 738.

Based on the processing system 700 executing a graphics application, for instance, the CPU 702, the AU 710, or both are configured to execute one or more instructions (e.g., draw calls) such that a scene including one or more graphics objects is rendered. After rendering such a scene, the processing system 700 stores the scene in the storage 714, displays the scene on the display 726, or both. The display 726, for example, includes a cathode-ray tube (CRT) display, liquid crystal display (LCD), light emitting diode (LED) display, organic light emitting diode (OLED) display, or any combination thereof. To enable the processing system 700 to display a scene on the display 726, the I/O circuitry 712 includes display circuitry 744. The display circuitry 744, for example, includes high-definition multimedia interface (HDMI) connectors, DisplayPort connectors, digital visual interface (DVI) connectors, USB connectors, and the like, each including circuitry configured to communicatively couple the display 726 to the I/O circuitry 712. Additionally or alternatively, the display circuitry 744 includes circuitry configured to manage the display of one or more scenes on the display 726 such as display controllers, buffers, memory, or any combination thereof.

Further, the CPU 702, the AU 710, or both are configured to concurrently run one or more virtual machines (VMs), which are each configured to execute one or more corresponding applications. To manage communications between such VMs and the underlying resources of the processing system 700, such as any one or more components of processing system 700, including the CPU 702, the I/O device 708, the AU 710, and the system memory 706, the I/O circuitry 712 includes memory management unit (MMU) 746 and input-output memory management unit (IOMMU) 748.

The MMU 746 includes, for example, circuitry configured to manage memory requests, such as from the CPU 702 to the system memory 706. For example, the MMU 746 is configured to handle memory requests issued from the CPU 702 and associated with a VM running on the CPU 702. These memory requests, for example, request access to read, write, fetch, or pre-fetch data residing at one or more virtual addresses (e.g., guest virtual addresses) each indicating one or more portions (e.g., physical memory addresses) of the system memory 706. Based on receiving a memory request from the CPU 702, the MMU 746 is configured to translate the virtual address indicated in the memory request to a physical address in the system memory 706 and to fulfill the request.

The IOMMU 748 includes, for example, circuitry configured to manage memory requests (memory-mapped I/O (MMIO) requests) from the CPU 702 to the I/O device 708, the AU 710, or both, and to manage memory requests (direct memory access (DMA) requests) from the I/O device 708 or the AU 710 to the system memory 706. For example, to access the registers 740 of the I/O device 708, the registers 736 of the AU 710, and/or the AU memory 734, the CPU 702 issues one or more MMIO requests. Such MMIO requests each request access to read, write, fetch, or pre-fetch data residing at one or more virtual addresses (e.g., guest virtual addresses) which each represent at least a portion of the registers 740 of the I/O device 708, the registers 736 of the AU 710, or the AU memory 734, respectively.

As another example, to access the system memory 706 without using the CPU 702, the I/O device 708, the AU 710, or both are configured to issue one or more DMA requests. Such DMA requests each request access to read, write, fetch, or pre-fetch data residing at one or more virtual addresses (e.g., device virtual addresses) which each represent at least a portion of the system memory 706. Based on receiving an MMIO request or DMA request, the IOMMU 748 is configured to translate the virtual address indicated in the MMIO or DMA request to a physical address and fulfill the request.

In variations, the processing system 700 can include any combination of the components depicted and described. For example, in at least one variation, the processing system 700 does not include one or more of the components depicted and described in relation to FIG. 7. Additionally or alternatively, in at least one variation, the processing system 700 includes additional and/or different components from those depicted. The 700 is configurable in a variety of ways with different combinations of components in accordance with the described techniques.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102, the processor 104, the memory system 106 having the volatile memory 108 and the non-volatile memory 110, the execution units 112, the load-store units 114, the cache system 116, and the slice hashing module 130) are implemented in any of a variety of different manners such as hardware circuitry, software or firmware executing on a programmable processor, or any combination of two or more of hardware, software, and firmware. The methods provided are implemented in various devices, such as general-purpose computers, processors, or processor cores. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include read-only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor comprising:
   slice hashing circuitry associated with a shared cache level of a hierarchy of one or more cache levels, the shared cache level including multiple slices accessible by a first thread of multiple threads running on a first processor core of multiple processor cores, the slice hashing circuitry configured to:
      assign, based on latency requirements or data usage of the first thread, memory addresses used by the first thread to a first subset of multiple subsets of the multiple slices closest to the first processor core.

2. The processor of claim 1, wherein the multiple subsets of the multiple slices in the shared cache level include at least two of:
   multiple one-slice groups;
   multiple two-slice groups;
   one or more four-slice groups; or
   one or more eight-slice groups.

3. The processor of claim 2, wherein the shared cache level includes eight slices and the multiple subsets include:
   eight one-slice groups;
   four two-slice groups;
   two four-slice groups; and
   one eight-slice group.

4. The processor of claim 2, wherein each processor core of the multiple processor cores is assigned to at least two of:
   a particular one-slice group of the multiple one-slice groups;
   a particular two-slice group of the multiple two-slice groups;
   a particular four-slice group of the one or more four-slice groups; or
   a particular eight-slice group of the one or more eight-slice groups.

5. The processor of claim 4, wherein the slice hashing circuitry is configured to assign the memory addresses used by the first thread to the first subset by:
   assigning the memory addresses to a first logical slice group, the first logical slice group being a one-slice grouping, a two-slice grouping, a four-slice grouping, or an eight-slice grouping; and
   in response to an assignment of the first thread to the first processor core, assigning the memory addresses to the first subset of multiple subsets corresponding to the first logical slice group and the first processor core.

6. The processor of claim 1, wherein the slice hashing circuitry is further configured to:
   determine a first mapping of the memory addresses to the first subset of the multiple subsets in the shared cache level;
   determine a second mapping of the memory addresses to the multiple slices in the shared cache level; and
   assign the memory addresses to the first mapping in response to a determination that the memory addresses are assigned to a selectable mapping range of memory addresses.

7. The processor of claim 6, wherein:
   the first mapping evenly distributes the memory addresses across the first subset of memory addresses; and the second mapping evenly distributes the memory addresses and second memory addresses across the multiple slices.

8. The processor of claim 7, wherein the second memory addresses is assigned to the second mapping in response to a determination that the second memory addresses are not assigned to the selectable mapping range of memory addresses.

9. The processor of claim 6, wherein the first mapping includes:
  a logical mapping that assigns the memory addresses to a first logical slice group, the first logical slice group being a one-slice grouping, a two-slice grouping, a four-slice grouping, or an eight-slice grouping; and
  a physical mapping that assigns the first logical slice group to the first subset based on an assignment of the first thread to the first processor core, the first subset including a same number of slices as the first logical slice group.

10. The processor of claim 6, wherein an application corresponding to the first thread assigns the first memory addresses to the selectable mapping range of memory addresses.

11. The processor of claim 6, wherein an operating system associated with the processor assigns the first memory addresses to the selectable mapping range of memory addresses based on the latency requirements or the data usage of the first thread.

12. The processor of claim 1, wherein the processor comprises a system on chip (SoC) with multiple processing cores.

13. A system comprising:
  multiple processor cores, wherein a first processor core of the multiple processor cores is assignable to a first thread of a first application and a second processor core is assignable to a second thread of a second application;
  a shared cache level of a hierarchy of one or more cache levels including multiple slices accessible by the multiple processor cores; and
  slice hashing circuitry associated with the shared cache level configured to assign first memory addresses used by the first thread to a first subset of the multiple slices closest to the first processor core and second memory addresses used by the second thread to a second subset of the multiple slices closest to the second processor core.

14. The system of claim 13, wherein:
  the first memory addresses have a same size of the second memory addresses; and
  the first subset of multiple slices includes a different number of slices than the second subset of multiple slices.

15. The system of claim 13, wherein the multiple subsets of the multiple slices in the shared cache level include at least two of:
  multiple one-slice groups;
  multiple two-slice groups;
  one or more four-slice groups; or
  one or more eight-slice groups.

16. The system of claim 13, wherein the slice hashing circuitry is further configured to:
  determine, based on a first slice hashing technique, a first mapping of the first memory addresses to the first subset and the second memory addresses to the second subset;
  determine, based on a second slice hashing technique, a second mapping of the first memory addresses and the second memory addresses to the multiple slices in the shared cache level;
  assign the first memory addresses to the first mapping in response to a determination that the first application is assigned to a selectable mapping range of memory addresses; and
  assign the second memory addresses to the second mapping in response to a determination that the second application is not assigned to the selectable mapping range of memory addresses.

17. The system of claim 16, wherein the first mapping includes:
  a logical mapping that assigns the first memory addresses to a first logical slice group, the first logical slice group being a one-slice grouping, a two-slice grouping, a four-slice grouping, or an eight-slice grouping; and
  a physical mapping that assigns the first logical slice group to the first subset based on an assignment of the first thread to the first processor core, the first subset including a same number of slices as the first logical slice group.

18. The system of claim 16, wherein an operating system associated with the multiple processor cores assigns the first application to the selectable mapping range of memory addresses based on latency requirements or data usage of the first application.

19. The system of claim 13, wherein the shared cache level is a level three cache.

20. A method comprising:
  determining a first mapping of memory addresses to a first subset of multiple slices in a shared cache level of a hierarchy of one or more cache levels, the memory addresses used by a thread running on a first processor core of multiple processor cores, the first subset of multiple slices being closer to the first processor core than a second subset of multiple slices with a same number of slices;
  determining a second mapping of the memory addresses to the multiple slices in the shared cache level; and
  assign the memory addresses to the first mapping in response to a determination that the memory addresses is assigned to a selectable mapping range of memory addresses.

* * * * *